United States Patent
Wegelin et al.

(10) Patent No.: US 9,902,606 B2
(45) Date of Patent: Feb. 27, 2018

(54) REFILL CONTAINER LABELING

(71) Applicant: GOJO Industries, Inc., Akron, OH (US)

(72) Inventors: Jackson William Wegelin, Stow, OH (US); Chip W. Curtis, West Dundee, IL (US)

(73) Assignee: GOJO Industries, Inc., Akron, OH (US)

(*) Notice: Subject to any disclaimer, the term of this patent is extended or adjusted under 35 U.S.C. 154(b) by 46 days.

(21) Appl. No.: 14/588,822

(22) Filed: Jan. 2, 2015

(65) Prior Publication Data

US 2015/0191342 A1    Jul. 9, 2015

Related U.S. Application Data

(63) Continuation of application No. 14/041,631, filed on Sep. 30, 2013, now abandoned, which is a
(Continued)

(51) Int. Cl.
*G06K 7/10* (2006.01)
*B67D 7/34* (2010.01)
(Continued)

(52) U.S. Cl.
CPC .............. *B67D 7/346* (2013.01); *B65B 61/26* (2013.01); *B65C 3/08* (2013.01); *G09F 3/00* (2013.01);
(Continued)

(58) Field of Classification Search
CPC ............... B05B 1/00; Y10T 428/24355; Y10T 428/24802; G02B 26/10; G06K 9/22;
(Continued)

(56) References Cited

U.S. PATENT DOCUMENTS

| | | |
|---|---|---|
| 4,870,260 A | 9/1989 | Niepolomski et al. |
| 5,028,769 A | 7/1991 | Claypool et al. |

(Continued)

FOREIGN PATENT DOCUMENTS

| | | |
|---|---|---|
| EP | 2005870 A1 | 12/2008 |
| EP | 2335537 A2 | 6/2011 |

(Continued)

OTHER PUBLICATIONS

Non-Final Office Action cited in U.S. Appl. No. 13/770,504 dated Jun. 5, 2014, 20 pgs.

(Continued)

*Primary Examiner* — Paul R Durand
*Assistant Examiner* — Andrew P Bainbridge
(74) *Attorney, Agent, or Firm* — Cooper Legal Group, LLC

(57) ABSTRACT

Among other things, one or more systems and/or techniques for labeling a refill contain and/or for enabling operation of the refill container by a dispensing system based upon one or more indicia of the label satisfying a dispensing key are provided. In an example, a label may be applied to a refill container. The label may comprise a first region having a first indicia that may correspond to a shape, color, and/or texture (e.g., a yellow star indicia). A dispensing system may enable operation of the refill container (e.g., installation and/or dispensing of material from the refill container) based upon the first indicia satisfying a dispensing key (e.g., a yellow key component and/or a star shape component). Otherwise, the dispensing system does not enable operation of the refill container (e.g., the refill container is not genuine or is not an appropriate refill container type).

20 Claims, 10 Drawing Sheets

Related U.S. Application Data continuation-in-part of application No. 13/770,504, filed on Feb. 19, 2013, now Pat. No. 9,120,106.

(51) Int. Cl.
| | |
|---|---|
| *G09F 3/00* | (2006.01) |
| *B65B 61/26* | (2006.01) |
| *B65C 3/08* | (2006.01) |
| *G06K 7/14* | (2006.01) |
| *G06K 19/06* | (2006.01) |
| *G02B 26/10* | (2006.01) |
| *G09F 3/02* | (2006.01) |

(52) U.S. Cl.
CPC .............. *G02B 26/10* (2013.01); *G06K 7/10* (2013.01); *G06K 7/14* (2013.01); *G06K 7/1404* (2013.01); *G06K 19/06* (2013.01); *G06K 19/06009* (2013.01); *G09F 2003/0208* (2013.01); *G09F 2003/0213* (2013.01); *G09F 2003/0272* (2013.01); *Y10T 428/24802* (2015.01)

(58) Field of Classification Search
CPC ........ G06K 7/14; G06K 7/10; G06K 7/10831; G06K 19/06; G06K 19/06009; G06K 19/06018; G06K 19/06037; G06K 19/06075; G06K 7/1404; G07F 9/026; B65C 3/08; B65B 61/26; B67D 7/346; G09F 3/00; G09F 3/0208; G09F 3/0213
USPC ...... 222/504, 333, 325–327, 153.01–153.02, 222/153.13; 235/454–455, 462.01, 900, 235/494, 381–382, 437, 440, 462.06, 235/462.15, 468–469, 462.31, 474, 465, 235/462.04, 462.13; 700/231, 240, 244, 700/235; 705/14.47
See application file for complete search history.

(56) References Cited

U.S. PATENT DOCUMENTS

| | | | |
|---|---|---|---|
| 5,585,616 A | 12/1996 | Roxby et al. | |
| 5,635,698 A | 6/1997 | Terada | |
| 5,960,991 A | 10/1999 | Ophardt | |
| 6,161,725 A | 12/2000 | Dean | |
| 6,412,666 B1 | 7/2002 | Hogan et al. | |
| 6,431,400 B1 | 8/2002 | O'Maley et al. | |
| 6,731,785 B1* | 5/2004 | Mennie | G07D 7/12 209/534 |
| 6,787,000 B2* | 9/2004 | Burazin | D21F 1/0027 162/116 |
| 7,028,861 B2 | 4/2006 | Sayers et al. | |
| 7,097,106 B2* | 8/2006 | Silverbrook | G06F 3/014 235/462.01 |
| 7,533,817 B2* | 5/2009 | Ming | G06K 19/06037 235/462.04 |
| 7,537,161 B2 | 5/2009 | Mayer et al. | |
| 7,619,819 B2 | 11/2009 | Moon et al. | |
| 7,621,426 B2 | 11/2009 | Reynolds et al. | |
| 7,783,380 B2 | 8/2010 | York et al. | |
| 7,784,679 B2 | 8/2010 | Dooley et al. | |
| 7,837,066 B2 | 11/2010 | Reynolds et al. | |
| 7,980,421 B2 | 7/2011 | Ophardt et al. | |
| 8,020,733 B2 | 9/2011 | Snodgrass | |
| 8,040,560 B2* | 10/2011 | Albat | H04N 1/6027 358/1.9 |
| 8,061,610 B2 | 11/2011 | Nunnink | |
| 8,113,432 B2* | 2/2012 | Kimura | G06K 1/123 235/469 |
| 8,173,355 B2* | 5/2012 | Irving | G03F 7/0005 430/311 |
| 8,550,350 B2* | 10/2013 | Cattrone | G06K 1/121 235/462.01 |
| 8,622,242 B2 | 1/2014 | Pelfrey | |
| 8,833,691 B1* | 9/2014 | Zosimadis | B65H 16/005 242/563.2 |
| 8,867,857 B2* | 10/2014 | Santos | G06T 5/003 235/454 |
| 8,879,832 B2* | 11/2014 | Dalal | G06K 7/1408 235/462.01 |
| 9,016,573 B2* | 4/2015 | Stangelmayer | G01N 21/274 235/375 |
| 9,330,290 B2* | 5/2016 | Lei | G06K 7/10732 |
| 2002/0104891 A1* | 8/2002 | Otto | G06Q 20/346 235/494 |
| 2004/0172162 A1 | 9/2004 | Bonney et al. | |
| 2005/0023354 A1* | 2/2005 | Sali | G06K 7/14 235/462.04 |
| 2005/0127090 A1 | 6/2005 | Sayers et al. | |
| 2006/0027660 A1* | 2/2006 | Ming | G06K 19/06037 235/462.04 |
| 2006/0131329 A1 | 6/2006 | Sayers et al. | |
| 2007/0295814 A1* | 12/2007 | Tanaka | G06K 7/10722 235/454 |
| 2008/0298688 A1* | 12/2008 | Cheong | G06K 7/14 382/224 |
| 2009/0314800 A1 | 12/2009 | Reynolds et al. | |
| 2010/0252568 A1 | 10/2010 | Ciavarello et al. | |
| 2011/0210173 A1 | 9/2011 | Adams et al. | |
| 2012/0033204 A1 | 2/2012 | Bratkovski et al. | |
| 2012/0068056 A1 | 3/2012 | Ophardt et al. | |
| 2012/0248149 A1 | 10/2012 | Pelfrey | |
| 2012/0278228 A1 | 11/2012 | Rubinstein | |
| 2013/0020351 A1 | 1/2013 | Pelfrey | |
| 2014/0144996 A1* | 5/2014 | Friedman | G06K 19/06103 235/494 |

FOREIGN PATENT DOCUMENTS

| | | |
|---|---|---|
| EP | 2387925 A2 | 11/2011 |
| EP | 2387926 A2 | 11/2011 |
| EP | 2014208 B1 | 11/2012 |
| EP | 2036477 B1 | 11/2012 |

OTHER PUBLICATIONS

Reply Non-Final Office Action cited in U.S. Appl. No. 13/770,504 dated Sep. 5, 2014, 12 pgs.
Final Office Action cited in U.S. Appl. No. 13/770,504 dated Jan. 8, 2015, 20 pgs.
Response after Final Office Action cited in U.S. Appl. No. 13/770,504 dated Apr. 8, 2015, 10 pgs.
Notice of Allowance cited in U.S. Appl. No. 13/770,504 dated Apr. 23, 2015, 10 pgs.
Corrected Notice of Allowance cited in U.S. Appl. No. 13/770,504 dated Jun. 1, 2015, 3 pgs.
Non-Final Office Action cited in U.S. Appl. No. 14/041,631 dated Feb. 6, 2014, 17 pgs.
Reply Non-Final Office Action cited in U.S. Appl. No. 14/041,631 dated May 6, 2014, 12 pgs.
Final Office Action cited in U.S. Appl. No. 14/041,631 dated Jul. 2, 2014, 16 pgs.
http://en.wikipedia.org/wiki/HSL and HSV; HSL and HSV Wikipedia, Jan. 14, 20134, 18 pgs.
2007 J. Phys.: Conf. Ser. 76 012054; (http://iopsciente.iop.org/1742-6596/76/1/012054), 2007, 7 pgs.

* cited by examiner

REFILL CONTAINER LABELING

RELATED APPLICATION

This application claims priority to and is a continuation of U.S. patent application Ser. No. 14/041,631, filed on Sep. 30, 2013 and titled "REFILL CONTAINER LABELING," which is a continuation-in-part of U.S. patent application Ser. No. 13/770,504, filed on Feb. 19, 2013 and titled "REFILL CONTAINER LABELING." U.S. patent application Ser. Nos. 14/041,631 and 13/770,504 are incorporated herein by reference.

TECHNICAL FIELD

The instant application is generally directed towards dispensing systems. For example, the instant application is directed to a dispensing system that enables operation of a refill container based upon a label of the refill container satisfying a dispensing key, such as a color key component, a shape key component, and/or a texture key component.

BACKGROUND

Many locations, such as hospitals, factories, restaurants, homes, etc., utilize dispensing systems to dispense material. For example, a dispensing system may dispense a liquid material, powder material, aerosol material, and/or other materials (e.g., soap, anti-bacterial gels, cleansers, disinfectants, lotions, etc.). Some dispensing systems utilize a refill container for ease of maintenance, environmental concerns, etc. The refill container may, for example, comprise a pump and/or nozzle mechanism that can be used by a dispensing system to dispense material from the refill container.

A manufacturer of a material may utilize one or more distributors to install dispensing systems at various end-user locations, and to install refill containers provided by the manufacturer into corresponding dispensing systems. The manufacturer may rely upon a distributor to install a correct refill container into a dispensing system. For example, a distributor may be required to install a refill container such that a dispensing system in an operating room of a hospital would dispense anti-bacterial soap, as opposed to moisturizer.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more labels for use with refill containers, one or more dispensing systems for controlling operation of refill containers, and/or one or more techniques for labeling refill containers are provided herein. In some embodiments, a label used to satisfy a dispensing key of a dispensing system is provided. In an example, the label may comprise a direct label that is printed, such as through an in-line printing technique, onto a refill container. In another example, the label may comprise a label that is attached to the refill container. The label comprises a first region having first indicia that is detectable by the dispensing system. In an example, the first indicia comprises a first color, a first shape, and/or a first texture. If the first indicia satisfies a dispensing key (e.g., an acceptable color or color range, an acceptable shape or shape range, and/or an acceptable texture or texture range, etc.), then the dispensing system enables operation of the refill container (e.g., installation of the refill container and/or dispensing of material from the refill container, etc.), otherwise the dispensing system does not enable operation of the refill container (e.g., because the refill container is not of a correct type, is not genuine, etc.). It will be appreciated that "indicia" and/or the like as used herein are generally intended to include one or more. That is, although indicia may be regarded as plural in the general vernacular, a single color, a single shape, etc. may be regarded as indicia as used herein.

In an example, a first visual detector, such as a red, green, blue light-emitting diode (RGB LED), may conduct based upon the detection of light interacting with the first region, which may be identified as detected color levels that may be compared with acceptable color levels specified by the dispensing key. For example, the detected color levels and the acceptable color levels may be compared based upon cylindrical color coordinates corresponding to a hue, saturation, and luminance (HSL) model or other color model. In another example, the label comprises a second region having a second indicia, such as a second color, a second shape, and/or a second texture. If the first indicia and the second indicia satisfy the dispensing key, then the dispensing system enables operation of the refill container, otherwise the dispensing system does not enable operation of the refill container. In this way, the label may comprise one or more regions having indicia that may be compared with the dispensing key to determine operability of the refill container.

In some embodiments, a dispensing system for controlling operation of a refill container is provided. The dispensing system comprises a dispenser configured to dispense a material, such as a liquid, powder, or aerosol, from the refill container. The dispensing system comprises a first illuminator configured to emit light substantially towards a first region of a label applied to the refill container (e.g., a label directly printed onto the refill container, a label affixed to the refill container, a label integrally formed with the refill container, etc.). For example, the refill container may be positioned within a housing of the dispensing system, such that the first illuminator can emit light substantially towards the label. A gasket or other device may be used to block ambient light. The dispensing system comprises a first visual detector that is configured to detect a first indicia of the first region based upon interaction of the emitted light with the first region. It may be appreciated that various types of visual detectors may be used, such as photodiodes, cameras, optical sensors, active pixel sensors, etc. In an example, the first visual detector comprises an RGB LED configured to detect one or more detected color levels, such as a blue, green, and/or red color levels, associated with the first region. The one or more detected color levels may, for example, be converted into cylindrical color coordinates based upon an HSL model or other color model, for example.

The dispensing system comprises a validator configured to compare the first indicia with a dispensing key, such as acceptable cylindrical color coordinates derived from acceptable color levels and the HSL model. Responsive to the first indicia satisfying the dispensing key, the validator enables operation of the refill container such that the dispenser accepts installation of the refill container and/or the dispenser dispenses material from the refill container, for example. Otherwise, the validator does not enable operation of the refill container. In an example, the dispensing system comprises multiple illuminators and/or visual detectors, such that multiple regions of the label may be evaluated to determine whether to enable operation of the refill container. The following description and annexed drawings set forth certain illustrative aspects and implementations. These are indicative of but a few of the various ways in which one or more aspects can be employed. Other aspects, advantages, and novel features of the disclosure will become apparent from the following detailed description when considered in conjunction with the annexed drawings.

DETAILED DESCRIPTION

Figure 1:
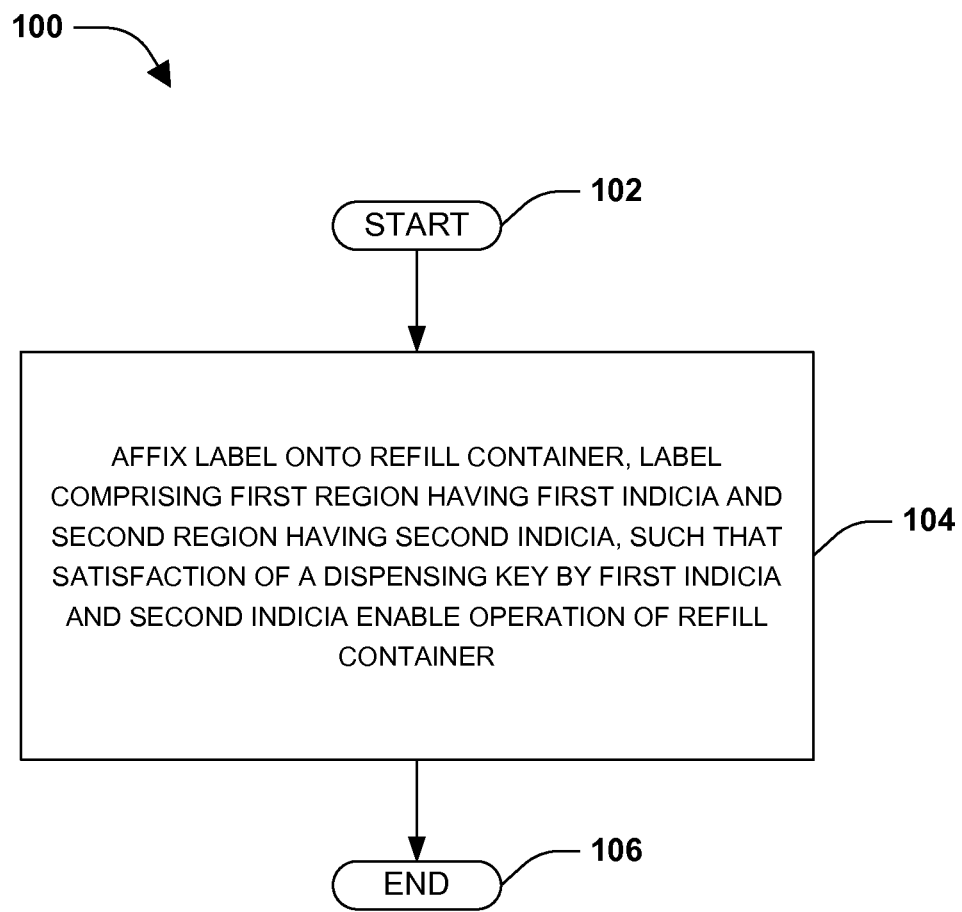
FIG. 1 is a flow diagram illustrating a method of keying a refill container for a dispensing system, according to some embodiments.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter.

An embodiment of keying a refill container for a dispensing system is illustrated by an exemplary method 100 of FIG. 1, and one or more labels formed by such a methodology are illustrated in FIGS. 2-6. At 102, the method starts. The dispensing system may be configured to dispense material, such as liquid, from a refill container based upon a label of the refill container satisfying a dispensing key, such as a color key component (e.g., cylindrical color coordinates derived from a hue, saturation, luminance (HSL) model), a shape key component, a texture key component, etc. It may be appreciated that the refill container may function to dispense material contained therein. In an example, the dispensing system and the refill container may act in concert to dispense material to a user. At 104, the label is applied to the refill container. In an example, the label is affixed or attached to the refill container. In another example, the label is directly printed onto the refill container. In another example, such as where the label comprises a texture, for example, the label is formed within or as part of the refill container. For example, where the refill container is formed from a molded plastic, the label (e.g., and/or indicia thereof) may be incorporated into the mold used to form the refill container. The label may, however, be made as part of the refill container in other manners as well. It will be appreciated that any one or more of the foregoing and/or other label creation, application, etc. techniques may be used alone or in combination with one another (e.g., where a label has a first region comprising color indicia and second region comprising texture indicia, where a first label has a first region with a first type of indicia and a second label has a second region with a second type of indicia, etc.). Application of a label, a label that is applied and/or like verbiage is intended to comprise any one or more of foregoing scenarios (e.g., attached, printed on, integral with, etc.).

The label comprises one or more regions having indicia (e.g., color, shape, texture, etc.) detectable by the dispensing system. For example, the label comprises a first region having a first indicia and a second region having a second indicia. If the first indicia and the second indicia satisfy a dispensing key, then the dispensing system enables operation of the refill container (e.g., installation of the refill container, dispensing of material from the refill container, etc.), otherwise the dispensing system does not enable operation of the refill container (e.g., because the refill container is not genuine, the refill container is an incorrect refill container type for the particular dispensing system, etc.). In some embodiments, the label is formed, at least in part, from an ink that changes properties (e.g., visibility, color, texture, shape, etc.) based upon time, humidity, temperature, light, and/or other factors. In an example, the dispensing key may correspond to a first key component associated with a first state of the label at a first point in time (e.g., before alteration of the ink), and a second key component associated with a second state of the label at a second point in time (e.g., after alteration of the ink over time and/or based upon the label being exposed to humidity, temperature, light, etc.).

Figure 2:
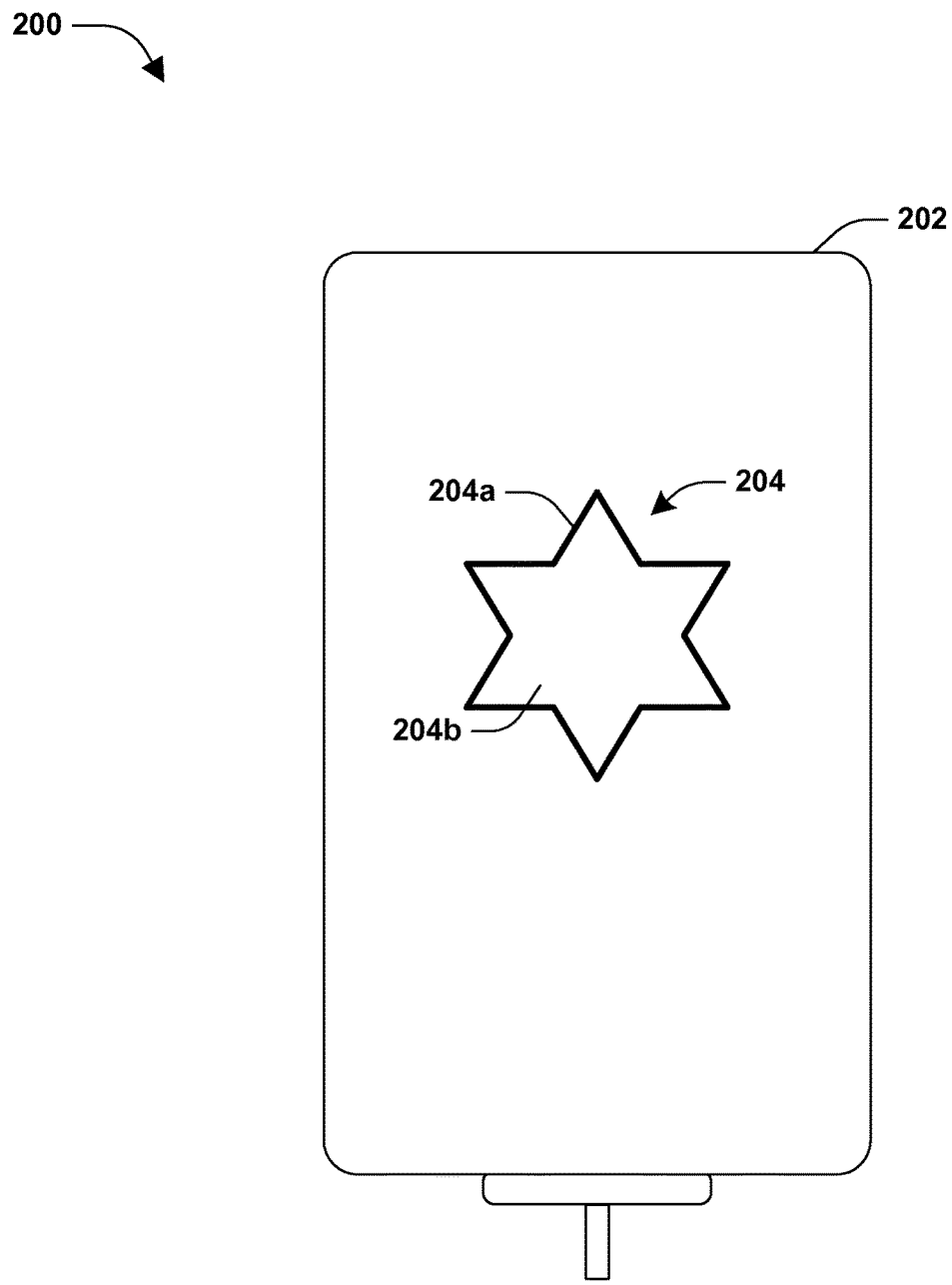
FIG. 2 is an illustration of a label, applied to a refill container, comprising a first region, according to some embodiments.

In some embodiments, a refill container 202 has a label comprising a first region having a shaped indicia, as illustrated by example 200 of FIG. 2. In the illustrated example, the shaped indicia comprises a star shaped indicia 204. When the refill container 202 is placed into a housing of a dispensing system, the dispensing system may determine whether the star shaped indicia 204 corresponds to a dispensing key, such as a star shaped key component. In an example, a visual detector of a dispensing system may detect interaction of emitted light with the star shaped indicia 204. For example, the visual detector may identify a first colored portion 204*a* (e.g., black) that outlines a second colored portion 204*b* (e.g., white). A validator of the dispensing system may determine whether the star shaped indicia 204 corresponds to a dispensing key, such as the star shaped key component. If the star shaped indicia 204 satisfies the dispensing key (e.g., the first colored portion 204*a* and/or 204*b* corresponds to a shape(s) and/or a color(s) of the star shaped key component), then the dispensing system enables operation of the refill container 202. Otherwise, the dispensing system does not enable operation of the refill container 202 (e.g., the star shaped key component corresponds to a particular range of green colors). In this way, one or more shape-based labeling techniques may be used to label refill containers to selectively enable dispensing material therefrom, for example.

In some embodiments, a refill container 302 has a label comprising multiple indicia. For example, the label may comprise a first region having a circular shaped indicia 306 and a second region having an octagonal shaped indicia 304, as illustrated by example 300 of FIG. 3. The first region is separated from the second region by an inactive region 308 (e.g., a region that does not affect operation of the refill container 302). The circular shaped indicia 306 is configured according to a red color and a circular shape, and the octagonal shaped indicia 304 is configured according to a green color and an octagonal shape. In an example, a first visual detector of a dispensing system may detect interaction of emitted light with the circular shaped indicia 306. A validator of the dispensing system may determine whether the circular shaped indicia 306 corresponds to a dispensing key (e.g., a first shape key component and/or a first color key component). A second visual detector of the dispensing system may detect interaction of emitted light with the octagonal shaped indicia 304. The validator of the dispensing system may determine whether the octagonal shaped indicia 304 corresponds to the dispensing key (e.g., a second shape key component and/or a second color key component). If the circular shaped indicia 306 and/or the octagonal shaped indicia 304 satisfy the dispensing key (e.g., where a first shape criterion is a circular shape, a first color criterion is red, a second shape criterion is an octagonal shape, and a second color criterion is green), then the dispensing system enables operation of the refill container 302. Otherwise, the dispensing system does not enable operation of the refill container 302 (e.g., where a first color criterion corresponds to purple instead of red). It may be appreciated that in another example, the dispensing key may merely comprise the first color key component and the second color key component (e.g., but no shape key components). In this way, the validator may enable or disable operation of the refill container 302 based upon determining whether the red color of the circular shaped indicia 306 and the green color of the octagonal shaped indicia 304 satisfy the first color key component and the second color key component. In this way, one or more color labeling techniques and/or one or more shape-based labeling techniques may be used to label refill containers to selectively enable dispensing material therefrom, for example.

In some embodiments, a refill container 402 has a label comprising multiple indicia. For example, the label may comprise a first region having a star shaped indicia 406, a second region 408 having a cross shaped indicia 408, and an inactive region 404, as illustrated by example 400 of FIG. 4. The inactive region 404 may be applied to the refill container 402 as a "fake" region that does not affect operation of the refill container 402. Accordingly, the star shaped indicia 406 and the cross shaped indicia 408, but not the inactive region 404, may be compared with a dispensing key to determine whether operation of the refill container 402 is to be enabled. In this way, the inactive region 404 may be applied to refill containers to mitigate replication of labels (e.g., counterfeit labels) used to enable operation of refill containers (e.g., by creating uncertainty as to what particular indicia will trigger operation of a refill container).

In an example, the first region is located on a first surface 402a (e.g., a front surface) of the refill container 402 and the second region is located on a second surface 402b (e.g., a surface that is different than the front surface). It may be appreciated that the first region, the second region, and/or other regions not illustrated may be located on any surface of the refill container 402 (e.g., a top surface, a bottom surface, a side surface, the front surface, a back surface, etc.). It will be appreciated that a dispensing system may comprise one or more visual detectors that are positioned within the dispensing system such that the one or more visual detectors are capable of detecting respective surfaces (e.g., and indicia thereon) of the refill container 402. It will also be appreciated that the instant disclosure, including the scope of the appended claims are not intended to be limited to the examples provided herein. For example, any one or more shapes, colors, textures, etc. may be utilized, implemented, etc., and not merely star, circular, cross shapes, for example.

In some embodiments, a refill container 502 has a label comprising multiple indicia. For example, the label may comprise a first region having a textured indicia 504, as illustrated by example 500 of FIG. 5. The textured indicia 504 is configured according to an arrow shape and a nub texture. In an example, a visual detector of a dispensing system may detect interaction of emitted light with the textured indicia 504. A validator of the dispensing system may determine whether the arrow shape and/or the nub texture satisfy a dispensing key. In an example, if the nub texture satisfies a texture key component, then the validator may enable operation of the refill container 502. In another example, if the nub texture satisfies the texture key component and the arrow shape satisfies a shape key component, then the validator may enable operation of the refill container 502. In this way, one or more texture labeling techniques may be used to label refill containers to selectively enable dispensing material therefrom, for example.

In some embodiments, a refill container 602 has a label comprising multiple indicia. For example, the label may comprise a first 3D region having a first circular indicia 604 and a second 3D region having a first polygonal indicia 606, a second polygonal indicia 608, and a third polygonal indicia 610, as illustrated by example 600 of FIG. 6. In an example, a first visual detector (e.g., a first RGB LED) of a dispensing system may detect interaction of emitted light (e.g., from a first white LED or other light source) with the first circular indicia 604. A validator of the dispensing system may determine whether a yellow color and/or a circular shape of the first circular indicia 604 satisfy a dispensing key, such as a first shape key component and/or a first color key component. A second visual detector (e.g., a second RGB LED) of the dispensing system may detect interaction of emitted light (e.g., from the first white LED or other light source) with the first polygonal indicia 606. In an example, the first circular indicia 604 and the first polygonal indicia 606 may be formed at similar or different depths. The validator may determine whether a red color and/or a polygonal shape of the first polygonal indicia 606 satisfy the dispensing key, such as a second shape key component and/or a second color key component. A third visual detector (e.g., a third RGB LED) of the dispensing system may detect interaction of emitted light (e.g., from a second white LED or other light source) with the second polygonal indicia 608. The validator may determine whether a yellow color and/or a polygonal shape of the second polygonal indicia 608 satisfy the dispensing key, such as a third shape key component and/or a third color key component. A fourth visual detector (e.g., a fourth RGB LED) of the dispensing system may detect interaction of emitted light (e.g., from a third white LED or other light source) with the third polygonal indicia 610. The validator may determine whether a green color and/or a polygonal shape of the third polygonal indicia 610 satisfy the dispensing key, such as a fourth shape key component and/or a fourth color key component. In this way, if first circular indicia 604, the first polygonal indicia 606, the second polygonal indicia 608, and/or the third polygonal indicia 610 satisfy the dispensing key, then operation of the refill container 602 may be enabled. In this way, one or more 3D labeling techniques may be used to label refill containers to selectively enable dispensing material therefrom, for example. As such, a label (e.g., or one or more labels) may be applied to, formed within, etc. a refill container such that satisfaction of a dispensing key by the label may enable operation of the refill container. It will be appreciated that one or more of the foregoing may overlap. For example, a single detector component may comprise the one or more visual detectors (e.g., LEDs) or multiple detector components may comprise the one or more visual detectors (e.g., LEDs). At 104, the method ends.

Figure 7:
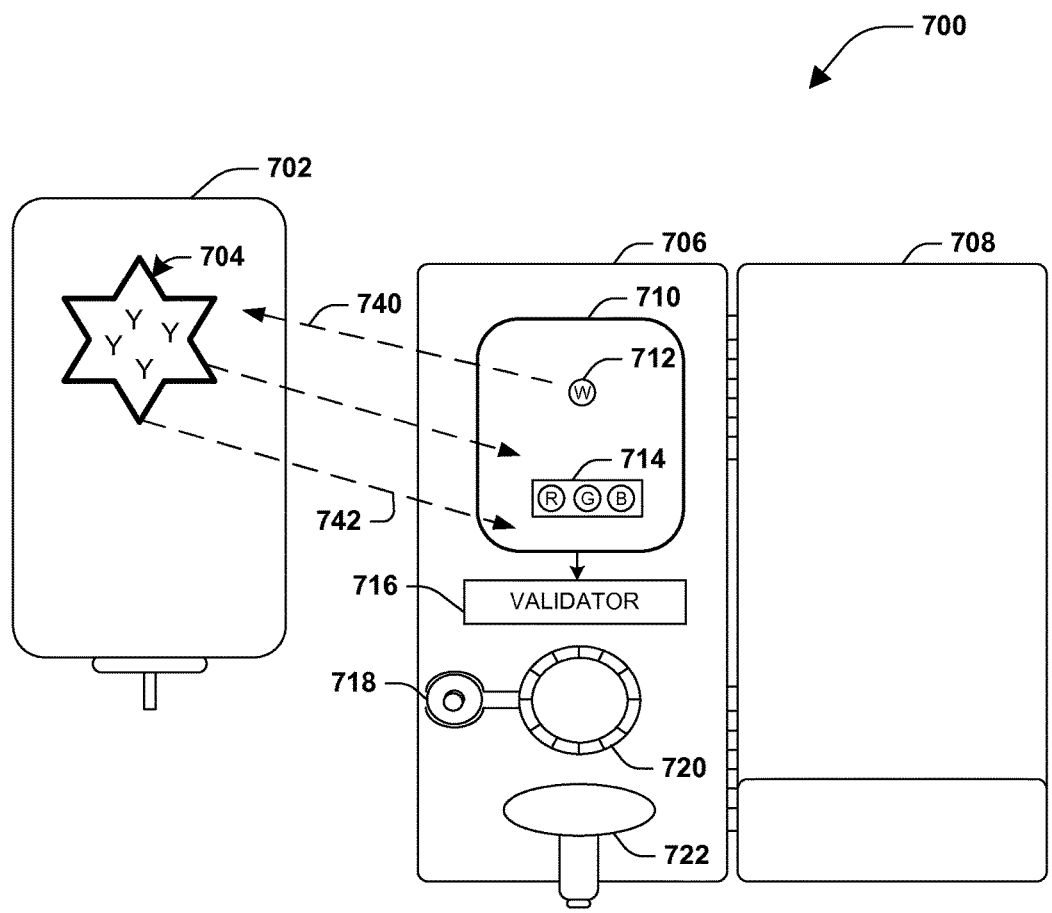
FIG. 7 is a component block diagram illustrating a system for controlling operation of a refill container, according to some embodiments.

FIG. 7 illustrates an example of a dispensing system 700 for controlling operation of a refill container 702. The refill container 702 may comprise a label (e.g., a label directly printed onto the refill container 702, a label attached to the refill container 702, a label formed as part of the refill container 702, etc.). The label may comprise a first region having a yellow star indicia 704. The dispensing system 700 may be configured to enable operation of the refill container 702 (e.g., installation of the refill container 702, dispensing of material from the refill container 702, etc.) based upon whether the yellow star indicia 704 satisfies a dispensing key.

The dispensing system 700 comprises a housing 706 that, in the illustrated example, is operably coupled to a door 708. In an example, the door 708 may pivot open from the housing 706 so that the refill container 702 may be positioned within the housing 706 for installation (e.g., when operation of the refill container 702 is enabled as provided herein). The housing 706 may comprise various mechanical and/or electrical components that facilitate operation of the dispensing system 700, such as one or more components that dispense material from the refill container 702. For example, the housing 706 may comprise a motor 718 and a gear train 720 used to operate a dispenser 722 that is configured to dispense material from the refill container 702 when a user activates the dispensing system 700 (e.g., a user may engage a dispense lever or place a hand under an optical actuator) (e.g., when operation of the refill container 702 is enabled as provided herein).

The dispensing system 700 may be configured control operation of the refill container 702 based upon the label, such as the yellow star indicia 704, satisfying a dispensing key. The dispensing system 700 may comprise a first illuminator 712, such as a white LED or other light source. The first illuminator 712 may be configured to emit light 740 substantially towards the first region (e.g., towards the yellow star indicia 704) of the label of the refill container 702. In an example, a gasket 710 may be configured to block ambient light during operation of the first illuminator 712 (e.g., the gasket 710 may form a substantially opaque seal around the first region of the label when the refill container is seated within the housing 706). The dispensing system 700 may comprise a first visual detector 714. It may be appreciated that the first visual detector 714 may comprise various types of visual detection components, such as one or more light-emitting diodes (LEDs), a red, green, blue (RGB) LED, an optical sensor, a photodiode, a photosensor, an active pixel sensor, a camera, etc. (e.g., an example of an RGB LED is illustrated in example 900 of FIG. 9). The first visual detector 714 is configured to detect a first indicia, such as the yellow star indicia 704, of the first region based upon interaction (e.g., reflection 742) of the emitted light, from the first illuminator 712, with the first region. For example, the first visual detector 714 may identify one or more detected color levels of the yellow star indicia 704, such as a red color level corresponding to conductivity associated with a red LED, a green color level corresponding to conductivity associated with a green LED, and/or a blue color level corresponding to conductivity associated with a blue LED (e.g., based upon wavelength(s) of light reflected from the yellow star indicia 704). In an example, a hue, saturation, luminance (HSL) model or other color model may be used to convert the one or more detected color levels into detected cylindrical color coordinates that may be compared to acceptable cylindrical color coordinates specified by the dispensing key.

The dispensing system 700 may comprise a validator 716 that is configured to compare the yellow star indicia 704 with the dispensing key. In an example, responsive to the yellow star indicia 704 satisfying the dispensing key (e.g., the detected cylindrical color coordinates may correspond to the acceptable cylindrical color coordinates specified by the dispensing key), the validator 716 enables operation of the refill container 702 such that the housing 706 accepts installation of the refill container 702 and/or the dispenser 722 dispenses material of the refill container 702 (e.g., the motor 718, the gear train 720, and/or other components within the housing 706 may become operational). Otherwise, the validator 716 does not enable operation of the refill container 702 because the label, such as the yellow star indicia 704, does not satisfy the dispensing key (e.g., the refill container 702 is not genuine, is not the correct refill container type, etc.).

Figure 8:
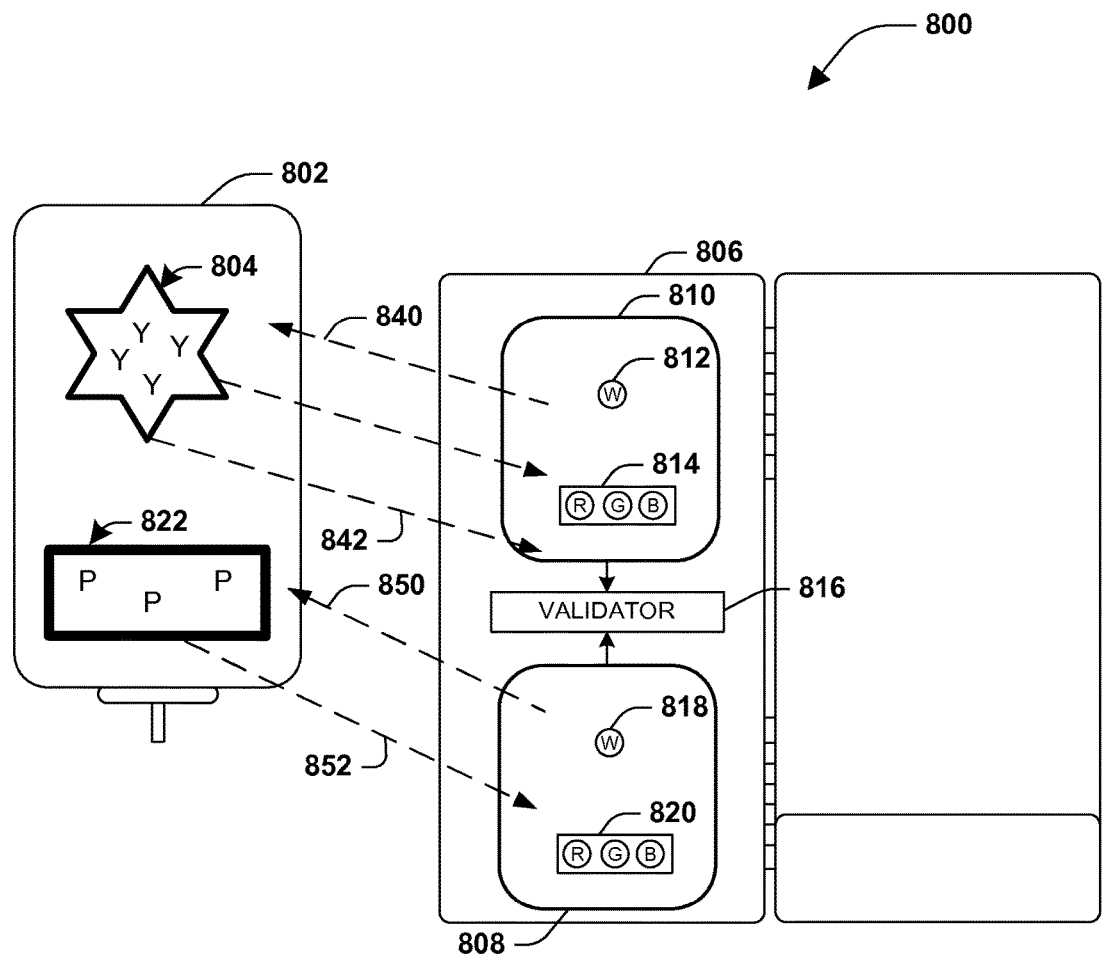
FIG. 8 is a component block diagram illustrating a system for controlling operation of a refill container, according to some embodiments.

FIG. 8 illustrates an example of a dispensing system 800 for controlling operation of a refill container 802. The refill container 802 may comprise a label (e.g., a label directly printed onto the refill container 802, a label attached to the refill container 802, a label formed as part of the refill container 802, etc.). The label may comprise a first region having a yellow star indicia 804 and a second region comprising a purple polygon indicia 822. The dispensing system 800 may be configured to enable operation of the refill container 802 (e.g., installation of the refill container 802, dispensing of material from the refill container 802, etc.) based upon whether the yellow star indicia 804 and/or the purple polygon indicia 822 satisfy a dispensing key.

The dispensing system 800 comprises a housing 806 that may comprise various mechanical and/or electrical components that facilitate operation of the dispensing system 800, such as dispensing material from the refill container 802. The dispensing system 800 may be configured to control operation of the refill container 802 based upon the label, such as the yellow star indicia 804 and/or the purple polygon indicia 822, satisfying the dispensing key.

The dispensing system 800 may comprise a first illuminator 812, such as a white LED or other light source. The first illuminator 812 may be configured to emit light 840 substantially towards the first region (e.g., towards the yellow star indicia 804) of the label of the refill container 802. In an example, a first gasket 810 may be configured to block ambient light during operation of the first illuminator 812 (e.g., the gasket 810 may form a substantially opaque seal around the first region of the label when the refill container is seated within the housing 806). The dispensing system 800 may comprise a first visual detector 814 that is configured to detect a first indicia, such as the yellow star indicia 804, of the first region based upon interaction (e.g., reflection 842) of the emitted light, from the first illuminator 812, with the first region. For example, the first visual detector 814 may detect one or more detected color levels of the yellow star indicia 804, such as a red color level corresponding to conductivity associated with a red LED, a green color level corresponding to conductivity associated with a green LED, and/or a blue color level corresponding to conductivity associated with a blue LED (e.g., based upon wavelength(s) of light reflected from the yellow star indicia 804). The one or more detected color levels of the yellow star indicia 804 may be compared with a first color key component and/or a first shape key component of the dispensing key.

The dispensing system 800 may comprise a second illuminator 818, such as a white LED or other light source. The second illuminator 818 may be configured to emit light 850 substantially towards the second region (e.g., towards the purple polygon indicia 822) of the label of the refill container 802. In an example, a second gasket 808 may be configured to block ambient light during operation of the second illuminator 818 (e.g., the second gasket 808 may form a substantially opaque seal around the second region of the label when the refill container is seated within the housing 806). The dispensing system 800 may comprise a second visual detector 820 that is configured to detect a second indicia, such as the purple polygon indicia 822, of the second region based upon interaction (e.g., reflection 852) of the emitted light, from the second illuminator 818, with the second region. For example, the second visual detector 820 may detect one or more second detected color levels of the purple polygon indicia 822, such as a second red color level corresponding to conductivity associated with a red LED, a second green color level corresponding to conductivity associated with a green LED, and/or a second blue color level corresponding to conductivity associated with a blue LED (e.g., based upon wavelength(s) of light reflected from the purple polygon indicia 822). The one or more second detected color levels of the purple polygon indicia 822 may be compared with a second color key component and/or a second shape key component of the dispensing key.

The dispensing system 800 may comprise a validator 816 that is configured to compare the yellow star indicia 804 and/or the purple polygon indicia 822, such as the one or more detected color levels and/or the one or more second detected color levels, with the dispensing key. That is, responsive to the yellow star indicia 804 and/or the purple polygon indicia 822 satisfying the dispensing key, the validator 816 enables operation of the refill container 802 such that the housing 806 accepts installation of the refill container 802, the dispenser dispenses material of the refill container 802, etc. Otherwise, the validator 816 does not enable operation of the refill container 802 because the label, such as the yellow star indicia 804 and/or the purple polygon indicia 822, do not satisfy the dispensing key (e.g., the refill container 802 is not genuine and/or is not the correct refill container type).

Figure 9:
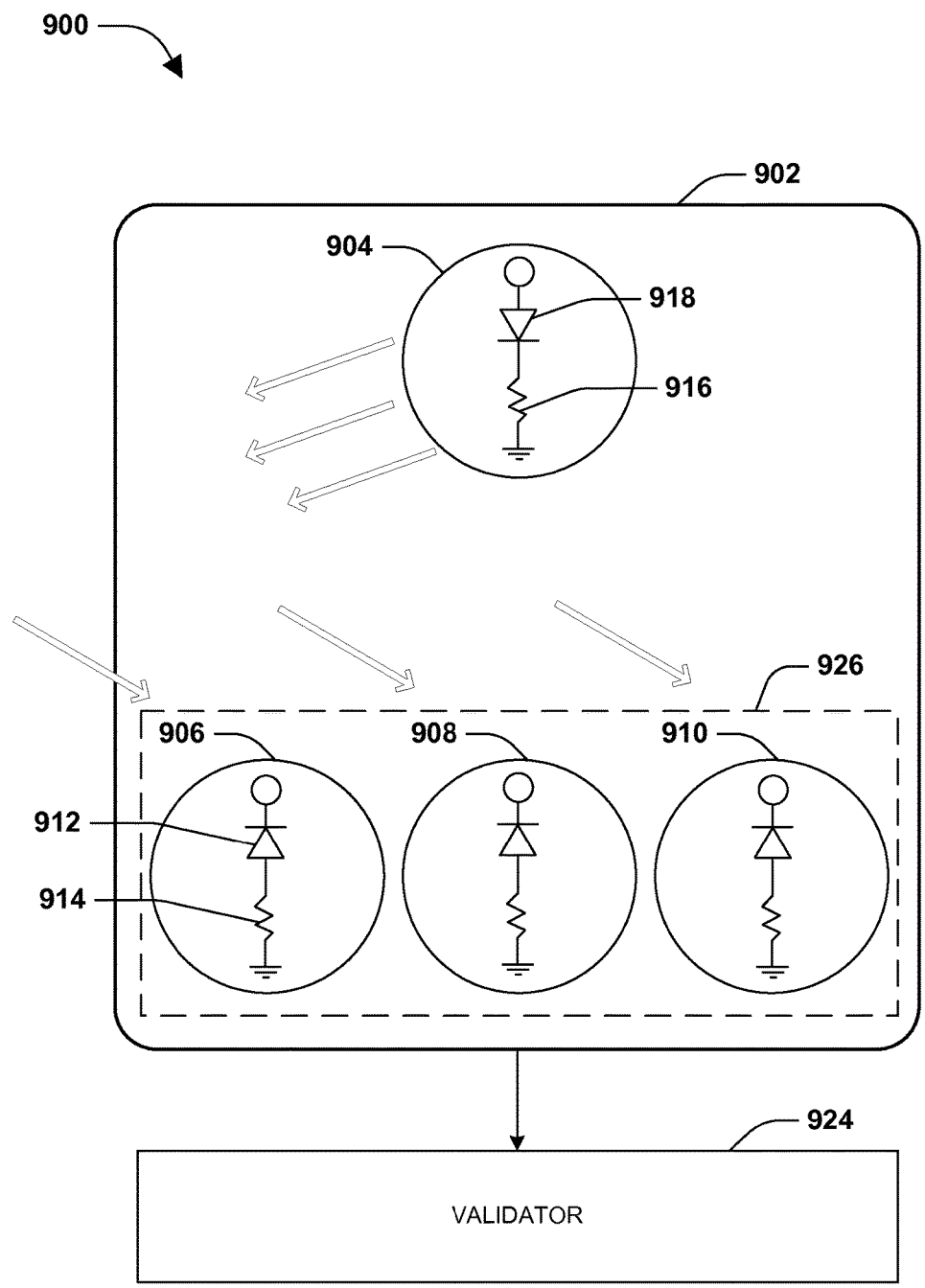
FIG. 9 is an illustration of an illuminator, a visual detector, and a validator, according to some embodiments.

FIG. 9 illustrates an example 900 of a dispensing system 902 comprising an illuminator 904, a visual detector 926, and a validator 924. In an example, the illuminator 904 comprises a white light-emitting diode (LED) or other light source. For example, the white LED may comprise a diode 918 that is coupled to ground through a resistor 916. The illuminator 904 is configured to emit light substantially towards one or more regions of a label of a refill container. In an example, the visual detector 926 comprises a red, green, blue light-emitting diode (RGB LED) comprising a first photodiode 906 (e.g., used to detect a red color level, such as based upon a wavelength corresponding to red), a second photodiode 908 (e.g., used to detect a green color level, such as based upon a wavelength corresponding to green), and/or a third photodiode 910 (e.g., used to detect a blue color level, such as based upon a wavelength corresponding to blue). For example, the first photodiode 906 comprises a reverse biased diode 912 that is coupled to ground through a resistor 914 (e.g., a 1 megaohm resistor or a resistor having a relatively large resistance).

In an example, a photodiode is configured to operate in a photovoltaic detection mode, such that the photodiode produces a voltage when exposed to light. In another example, a photodiode is configured to operate in a photoconductive detection mode, such that electrical conductivity of the photodiode is controlled based upon exposure to light (e.g., a photocurrent is created based upon the detected light). In some embodiments, an LED is charged to a first voltage, such as a voltage representing a logical 1 (e.g., charged to 5 voltages within 100 to 200 microseconds). The charge of the first voltage is substantially maintained by the LED based upon inherent capacitance properties of the LED. Under reverse bias conditions, light intensity of light incident on the LED corresponds to a photocurrent produced by the LED. In an example, voltage of the LED is polled to determine a decay time corresponding to a time span from when the LED is charged to the first voltage until the LED discharges to a second voltage, such as a voltage representing a logical 0. The decay time is inversely proportional to an amount of light detected by the LED, and thus the photocurrent can be calculated based upon the decay time. That is, when the LED detects relatively increased amounts of light, the LED discharges faster, thus resulting in a decreased decay time. When the LED detects relatively decreased amounts of light, the LED discharges slower, thus resulting in an increased decay time.

The validator 924 may be configured to detect color levels associated with the label based upon light detected by of the first photodiode 906, the second photodiode 908, and/or the third photodiode 910 (e.g., based upon a photocurrent, voltage level, decay time, etc.). It may be appreciated that a wide variety of electrical-based and/or software-based detection techniques may be used to identify color, shape, and/or texture of a label, and that merely a few examples are provided for illustrative purposes. The validator 924 may be configured to convert the electrical measurement data (e.g., conductivity, voltage, current, etc.) into detected cylindrical color coordinates derived from a hue, saturation, and luminance (HSL) model. In this way, the validator 924 may compare the detected cylindrical color coordinates with acceptable cylindrical color coordinates specified by a dispensing key, for example.

In some embodiments, a label for use on a refill container for a dispensing system is provided. The label may be used to train the dispensing system for improved accuracy in detecting acceptable color codes on labels for enabling operation of refill containers by the dispensing system. That is, the dispensing system may be initially calibrated with an analog dispensing key. In an example, the analog dispensing key may correspond to one or more analog color tolerance ranges specifying analog ranges of acceptable color values (e.g., red, blue, green, and white levels). However, accuracy of the analog dispensing key may be diminished based upon various factors, such as inaccuracy of color detection technology (e.g., the dispensing system may comprise photodiodes as opposed to sophisticated color detection technology due to a tradeoff of color detection accuracy for cost efficiency), color variations in label print runs or printing machines, etc. Accordingly, the dispensing system may be trained by modifying the analog dispensing key to create a refined analog dispensing key based upon feedback provided by color codes on labels.

Figure 3:
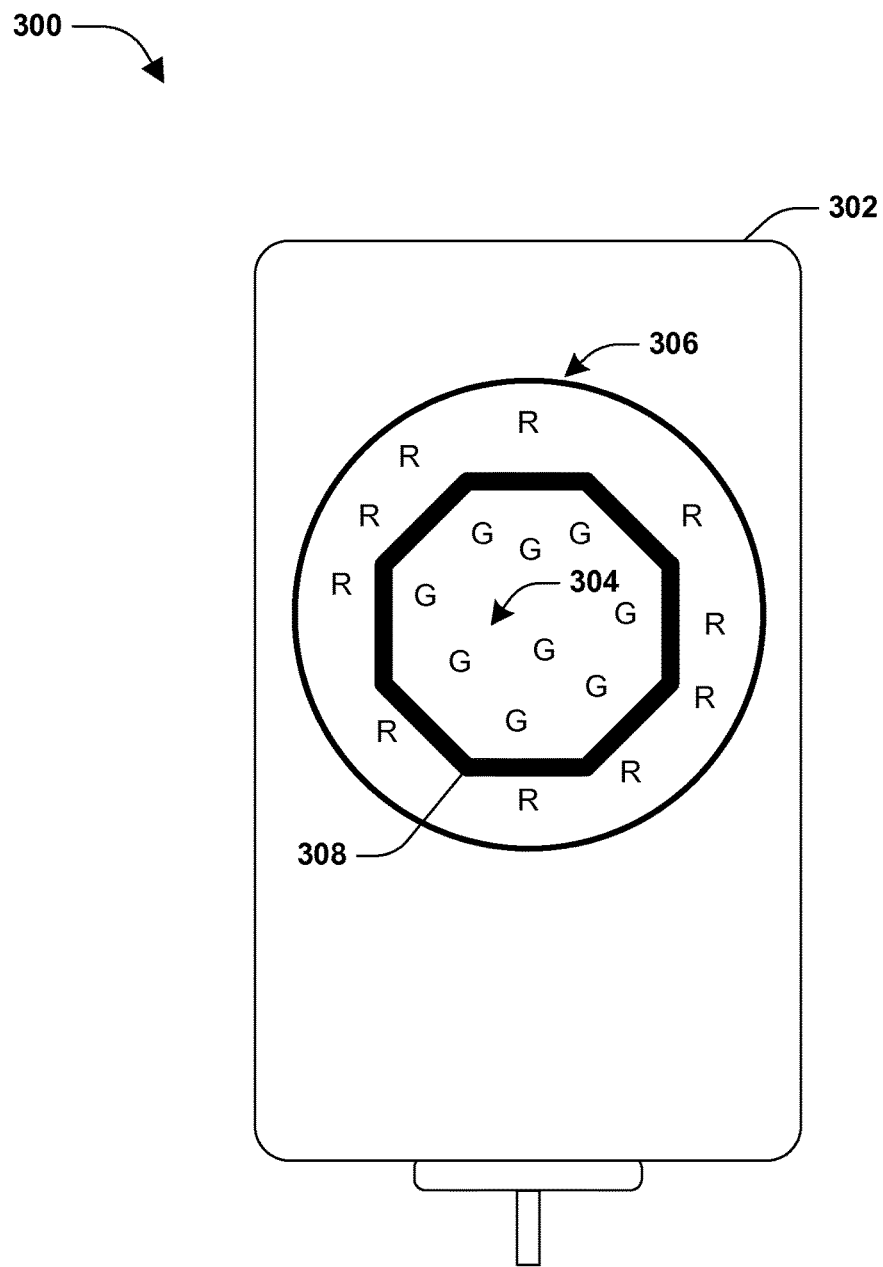
FIG. 3 is an illustration of a label, applied to a refill container, comprising a first region and a second region, according to some embodiments.
Figure 4:
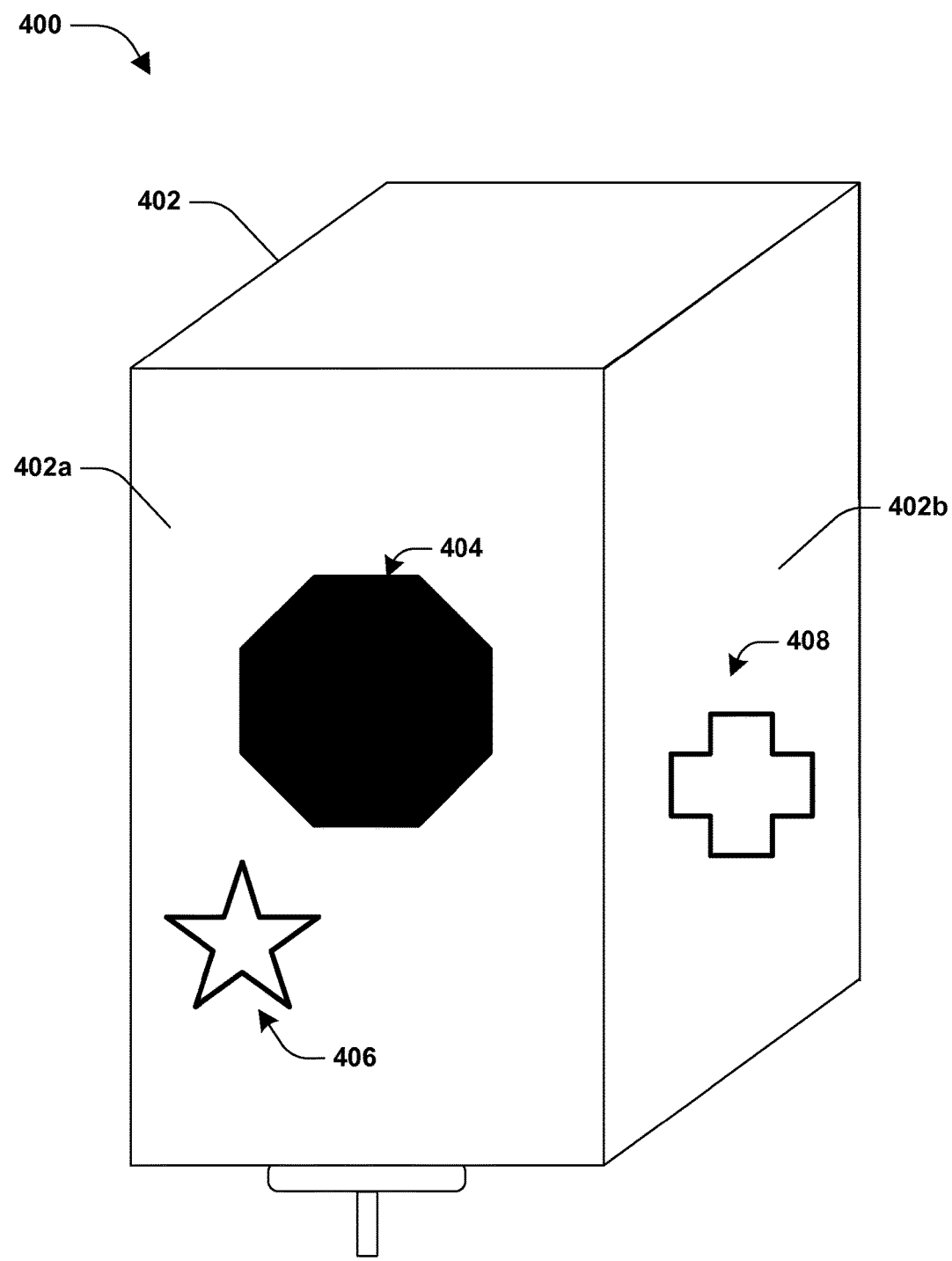
FIG. 4 is an illustration of a label, applied to a refill container, comprising a first region on a first surface of the refill container, a second region on a second side of the refill container, and an inactive region on the first surface of the refill container, according to some embodiments.
Figure 5:
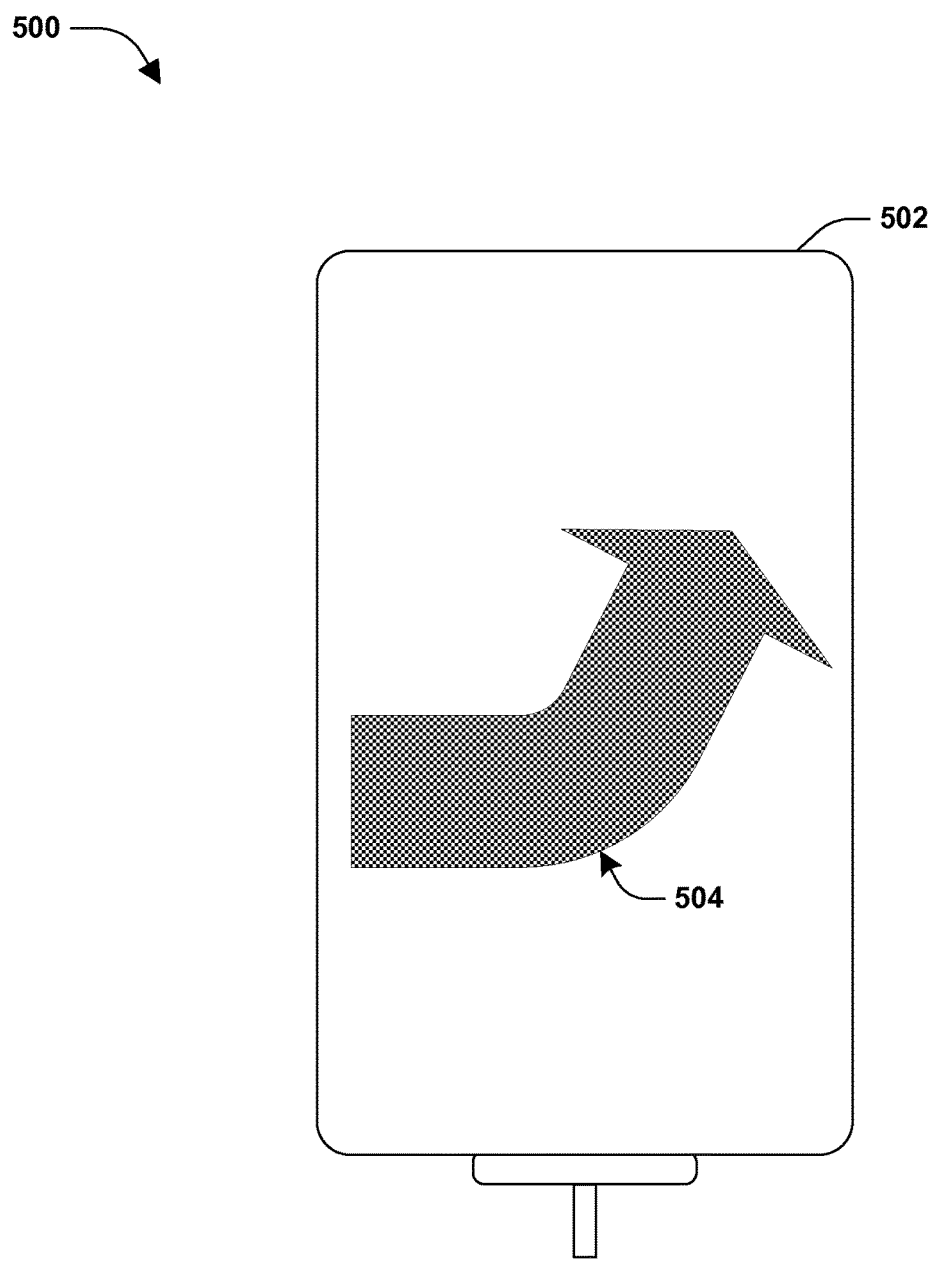
FIG. 5 is an illustration of a label, applied to a refill container, comprising a first region, according to some embodiments.
Figure 6:
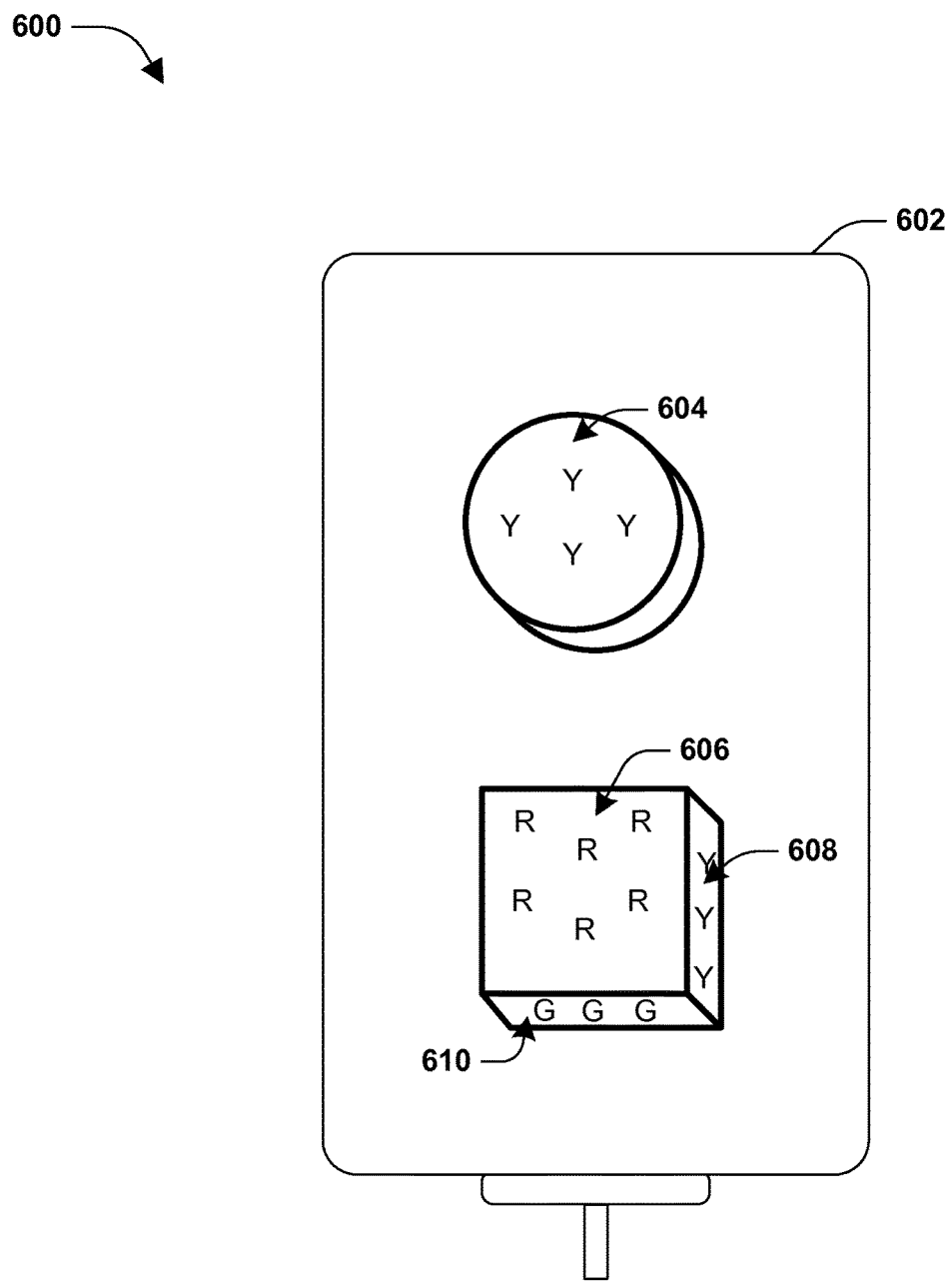
FIG. 6 is an illustration of a 3D label, applied to a refill container, comprising a first 3D region and a second 3D region, according to some embodiments.

In an example, the label comprises one or more color codes (e.g., circular shaped indicia 306 comprises a red color code and octagonal shaped indicia 304 comprises a green color code, as illustrated in FIG. 3). For example, the label comprises a first color code (e.g., a blue color code corresponding to a shade of blue) detectable by the dispensing system. The dispensing system may maintain the analog dispensing key specifying one or more analog color tolerance ranges, such as a first analog color tolerance range (e.g., a range of blue colors) and a second analog color tolerance range (e.g., a range of green colors that are adjacent to blue colors on a color wheel). It may be appreciated that the analog dispensing key may not be initially calibrated with correct analog color tolerance ranges, and thus may initially specify more acceptable color ranges than are to be accepted (e.g., blue colors codes, but not green color codes, are actually to be accepted, however, initial calibration may be inaccurately specified shades of green). If a color code of a label satisfies at least one analog color tolerance range specified by the analog dispensing key, then the dispensing system may enable operation of the refill container, otherwise the dispensing system may not enable operation of the refill container. If the color code satisfies the first analog color tolerance range (e.g., the blue color is within the range of blue colors) and not the second analog color tolerance range, then the dispensing system modifies at least one of the first analog color tolerance range or the second analog color tolerance range to create a refined analog dispensing key. In an example, the first analog color tolerance range is affirmed. In another example, the second analog color tolerance range is removed (e.g., the analog dispensing key may have been initially calibrated to detect blue and/or green as acceptable colors, however, the blue color code of the label may be used to refine the analog dispensing key to merely accept shades of blue, thus filtering out shades of green that were not actually supposed to be acceptable colors). In another example, the second analog color tolerance range may be narrowed (e.g., the second analog color tolerance range may be narrowed to merely correspond to shades of green that are similar to blue). In this way, the analog dispensing key may be refined based upon color codes of labels detected by the dispensing system (e.g., a first label of a first refill container, a second label of a second refill container, a threshold number of labels before the dispensing system disables further refinement of the analog dispensing key, etc.).

In an example, the first color code is affixed (e.g., as a first indicia) to a first side of the refill container and a second color code of the label is affixed (e.g., as a second indicia) to a second side of the refill container. It may be appreciated that the label may comprise any number of color codes arranged according to various configurations (e.g., shapes, sizes, orientations, etc.). In an example, the first color code, and/or second color code, etc. may comprise ink that changes based upon time, humidity, temperature, light, and/or other factors.

In an example, the dispensing system comprises a validator configured to implement fuzzy logic to learn based upon labels detected by the dispensing system. The validator may be configured to modify the analog dispensing key to create the refined analog dispensing key.

In some embodiments, a label comprises a first color code detectable by a dispensing system. The first color code may be configured to invoke the dispensing system to generate an analog dispensing key specifying a first analog color tolerance range and a second analog color tolerance range used to determine whether the dispensing system enables operation of a second refill container subsequently associated with the dispensing system. The first analog color tolerance range and/or the second analog color tolerance range may be modified based upon detection of a second color code affixed to the second refill container. In this way, the analog dispensing key may be refined.

In an embodiment of a label for use on a refill container for a dispensing system, a dispensing system comprises a first color code detectable by the dispensing system comprising an analog dispensing key specifying a first analog color tolerance range and a second analog color tolerance range, such that responsive to the first color code corresponding to the first analog color tolerance range and not the second analog color tolerance range, then the dispensing system modifies at least one of the first analog color tolerance range or the second analog color tolerance range to create a refined analog dispensing key.

In an embodiment, the first color code is configured to invoke the dispensing system to remove the second analog color tolerance range responsive to the first color code corresponding to the first analog color tolerance range and not the second analog color tolerance range.

In an embodiment, the first color code is configured to invoke the dispensing system to narrow the second analog color tolerance range responsive to the first color code corresponding to the first analog color tolerance range and not the second analog color tolerance range.

In an embodiment, the first color code is configured to invoke the dispensing system to confirm the first analog color tolerance range as an acceptable color code for activation of the dispensing system responsive to the first color code corresponding to the first analog color tolerance range and not the second analog color tolerance range.

In an embodiment, the first color code is configured to invoke the dispensing system to enable operation of the refill container based upon the first color code satisfying at least one of the first analog color tolerance range or the second analog color tolerance range.

In an embodiment, a second color code is detectable by the dispensing system, such that if the first color code and the second color code satisfy the analog dispensing key, then the dispensing system enables operation of the refill container, otherwise the dispensing system does not enable operation of the refill container.

In an embodiment, the first analog color tolerance range corresponds to a first color and the second analog color tolerance range corresponding to a second color.

In an embodiment, the first color is adjacent to the second color within a color wheel.

In an embodiment, the first color code corresponds to a first color and the second color code corresponding to a second color.

In an embodiment, the first color code is affixed to a first portion of the refill container and the second color code is affixed to a second portion of the refill container.

In an embodiment, the first color code is affixed to a first side of the refill container and the second color code is affixed to a second side of the refill container.

In an embodiment, the first color code comprises ink that changes based upon at least one of time, humidity, temperature, or light.

In an embodiment, the first color code comprises a first shape and the second color code comprising a second shape.

In an embodiment of a label for use on a refill container for a dispensing system, a dispensing system comprises a first color code detectable by the dispensing system comprising an analog dispensing key specifying an analog color tolerance range, the first color code configured to invoke the dispensing system to modify the analog color tolerance range to create a refined analog dispensing key based upon detected color data associated with detection of the first color code.

In an embodiment, the first color code is configured to invoke the dispensing system to narrow the analog color tolerance range responsive to the first color code corresponding to the analog color tolerance range.

In an embodiment, the first color code is configured to invoke the dispensing system to expand the analog color tolerance range responsive to the first color code not corresponding to the analog color tolerance range.

In an embodiment, the first color code is configured to invoke the dispensing system to confirm the analog color range within the refined analog dispensing key responsive to the first color code corresponding to the analog color tolerance range.

In an embodiment, the first color code is configured to invoke the dispensing system to create a second analog color tolerance range within the refined analog dispensing key responsive to the first color code falling outside the analog color tolerance range.

In an embodiment of a label for use on a refill container for a dispensing system, a dispensing system comprises a first color code detectable by the dispensing system, the first color code configured to invoke the dispensing system to generate an analog dispensing key specifying a first analog color tolerance range and a second analog color tolerance range used to determine whether the dispensing system enables operation of a second refill container subsequently associated with the dispensing system.

In an embodiment, at least one of the first analog color tolerance range or the second analog color tolerance range is modifiable based upon detection of a second color code affixed to the second refill container.

Figure 10:
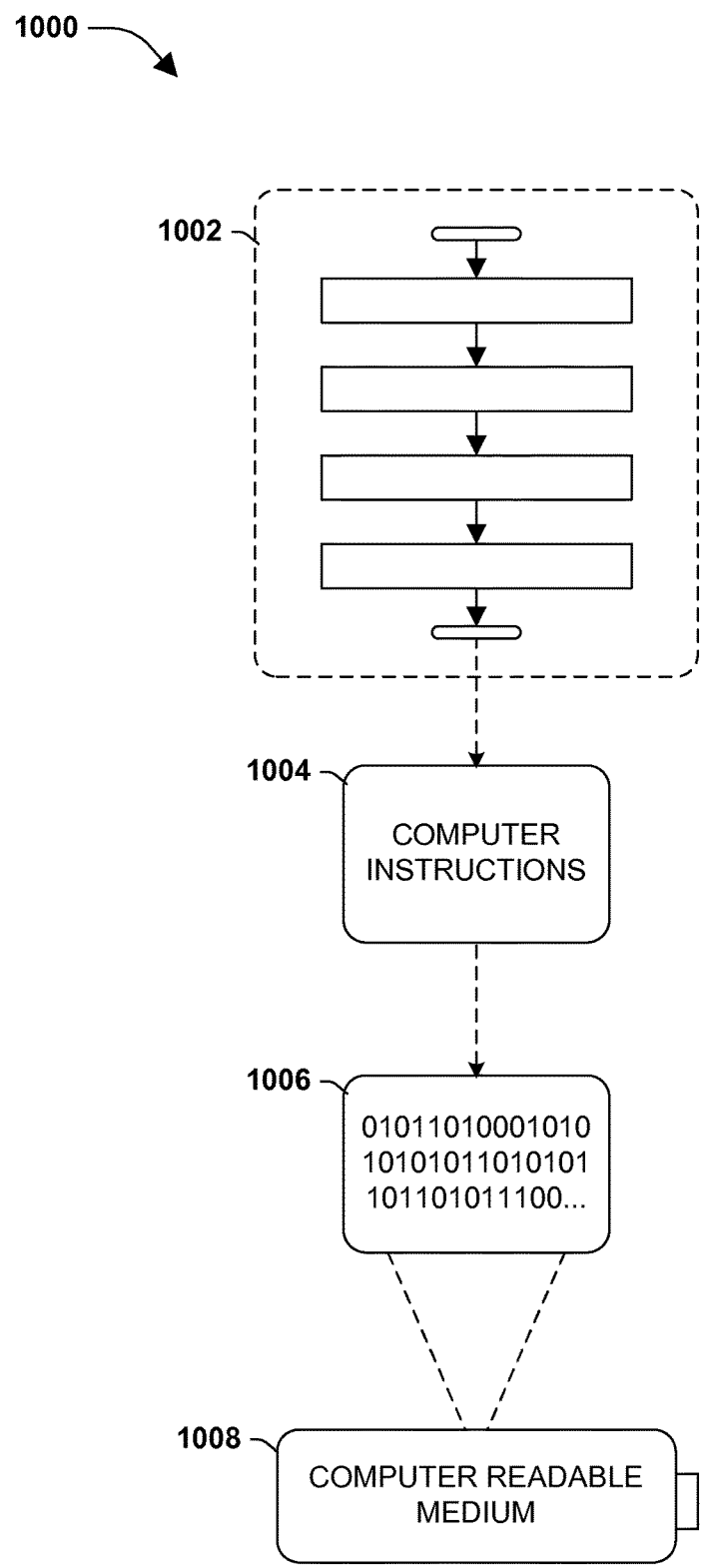
FIG. 10 is an illustration of an example computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 10, wherein the implementation 1000 comprises a computer-readable medium 1008, such as a CD-R, DVD-R, flash drive, a platter of a hard disk drive, etc., on which is encoded computer-readable data 1006. This computer-readable data 1006, such as binary data comprising at least one of a zero or a one, in turn comprises a set of computer instructions 1004 configured to operate according to one or more of the principles set forth herein. In some embodiments, the processor-executable computer instructions 1004 are configured to perform a method 1002, such as at least some of the exemplary method 100 of FIG. 1, for example. In some embodiments, the processor-executable instructions 1004 are configured to implement a system, such as at least some of the exemplary system 700 of FIG. 7 and/or at least some of the exemplary system 800 of FIG. 8, for example. Many such computer-readable media are devised by those of ordinary skill in the art that are configured to operate in accordance with the techniques presented herein.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component is localized on one computer or distributed between two or more computers.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first shape and a second shape generally correspond to shape A and shape B or two different or identical shapes or the same shape.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A dispensing system for dispensing a hygiene product, comprising:
 a housing into which a refill container comprising the hygiene product is seated, the refill container comprising a label having a first color code;
 an illuminator configured to illuminate the label; and a validator configured to validate the refill container based upon a reflection by the label upon the label being illuminated by the illuminator, the validator associated with a dispensing key having a color tolerance range comprising a first analog color tolerance range and a second analog color tolerance range and the validator configured to at least one of enable the housing to accept the refill container or enable a dispenser of the dispensing system to dispense the hygiene product from the refill container responsive to the reflection being within the color tolerance range, the validator further configured to refine the color tolerance range by removing the second analog color tolerance range based upon the reflection corresponding to the first analog color tolerance range and not the second analog color tolerance range to create a refined dispensing key for subsequent validations.

2. The dispensing system of claim 1, wherein the validator refines the color tolerance range by narrowing the color tolerance range based upon a color associated with the reflection.

3. The dispensing system of claim 1, comprising a detector configured to detect the reflection, the detector operably coupled to the validator.

4. A label for use on a refill container for a dispensing system, comprising:
a first color code detectable by the dispensing system comprising an analog dispensing key specifying a first analog color tolerance range and a second analog color tolerance range, such that responsive to the first color code corresponding to the first analog color tolerance range and not the second analog color tolerance range, then the dispensing system modifies at least one of the first analog color tolerance range or the second analog color tolerance range to create a refined analog dispensing key, wherein the first color code is configured to invoke the dispensing system to enable operation of the refill container responsive to the first color code corresponding to the first analog color tolerance range.

5. The label of claim 4, the first color code configured to invoke the dispensing system to remove the second analog color tolerance range responsive to the first color code corresponding to the first analog color tolerance range and not the second analog color tolerance range.

6. The label of claim 4, the first color code configured to invoke the dispensing system to narrow the second analog color tolerance range responsive to the first color code corresponding to the first analog color tolerance range and not the second analog color tolerance range.

7. The label of claim 4, the first color code configured to invoke the dispensing system to confirm the first analog color tolerance range as an acceptable color code for activation of the dispensing system responsive to the first color code corresponding to the first analog color tolerance range and not the second analog color tolerance range.

8. The label of claim 4, the first analog color tolerance range corresponding to a first range of colors.

9. The label of claim 4, comprising:
a second color code detectable by the dispensing system, such that if the first color code and the second color code satisfy the analog dispensing key, then the dispensing system enables operation of the refill container, otherwise the dispensing system does not enable operation of the refill container.

10. The label of claim 9, the first color code corresponding to a first color and the second color code corresponding to a second color.

11. The label of claim 9, the first color code comprising a first shape and the second color code comprising a second shape.

12. The label of claim 9, the first color code affixed to a first portion of the refill container and the second color code affixed to a second portion of the refill container.

13. The label of claim 12, the first color code affixed to a first side of the refill container and the second color code affixed to a second side of the refill container, the first side not parallel to the second side.

14. The label of claim 8, the second analog color tolerance range corresponding to a second range of colors that do not overlap the first range of colors.

15. The label of claim 4, the first color code comprising ink that changes based upon at least one of time, humidity, temperature, or light.

16. A label for use on a refill container for a dispensing system, comprising:
a first color code detectable by the dispensing system comprising an analog dispensing key specifying an analog color tolerance range, the first color code configured to invoke the dispensing system to modify the analog color tolerance range to create a refined analog dispensing key based upon a detected reflection of the first color code, wherein the first color code is configured to invoke the dispensing system to confirm the analog color range within the refined analog dispensing key responsive to the first color code corresponding to the analog color tolerance range.

17. The label of claim 16, the first color code configured to invoke the dispensing system to narrow the analog color tolerance range responsive to the first color code corresponding to the analog color tolerance range.

18. The label of claim 16, the first color code configured to invoke the dispensing system to expand the analog color tolerance range responsive to the first color code not corresponding to the analog color tolerance range.

19. The label of claim 16, the first color code comprising ink that changes based upon at least one of time, humidity, temperature, or light.

20. The label of claim 16, the first color code configured to invoke the dispensing system to create a second analog color tolerance range within the refined analog dispensing key responsive to the first color code falling outside the analog color tolerance range.

* * * * *